United States Patent
Själin et al.

(10) Patent No.: US 12,025,138 B2
(45) Date of Patent: Jul. 2, 2024

(54) METHOD FOR DETECTING A PUMP OR MIXER OPERATING IN PART LIQUID AND PART GAS

(71) Applicant: Xylem Europe GmbH, Schaffhausen (CH)

(72) Inventors: Sebastian Själin, Järfälla (SE); Alexander Fullemann, Stockholm (SE)

(73) Assignee: Xylem Europe GmbH, Schaffhausen (CH)

( * ) Notice: Subject to any disclaimer, the term of this patent is extended or adjusted under 35 U.S.C. 154(b) by 369 days.

(21) Appl. No.: 17/440,501

(22) PCT Filed: Mar. 18, 2020

(86) PCT No.: PCT/EP2020/057373
§ 371 (c)(1),
(2) Date: Sep. 17, 2021

(87) PCT Pub. No.: WO2020/187958
PCT Pub. Date: Sep. 24, 2020

(65) Prior Publication Data
US 2022/0170468 A1   Jun. 2, 2022

(30) Foreign Application Priority Data
Mar. 20, 2019 (EP) .................... 19164028

(51) Int. Cl.
F04D 15/00 (2006.01)
F04D 15/02 (2006.01)

(52) U.S. Cl.
CPC ..... *F04D 15/0088* (2013.01); *F04D 15/0236* (2013.01)

(58) Field of Classification Search
None
See application file for complete search history.

(56) References Cited

U.S. PATENT DOCUMENTS

| | | | | |
|---|---|---|---|---|
| 2009/0290991 A1* | 11/2009 | Mehlhorn | ........... | F04D 15/0066 417/44.11 |
| 2010/0034665 A1* | 2/2010 | Zhong | ................. | F04D 15/0066 417/42 |
| 2014/0369854 A1* | 12/2014 | Fullemann | .............. | F04D 13/08 417/44.1 |
| 2019/0293065 A1 | 9/2019 | Zhong | | |

FOREIGN PATENT DOCUMENTS

| | | |
|---|---|---|
| CN | 109154289 A | 1/2019 |
| EP | 3246572 A1 | 11/2017 |

OTHER PUBLICATIONS

Chinese Office Action with Search Report for Chinese Application No. 202080022005.8, dated Aug. 16, 2023, 8 pages.
International Search Report and Written Opinion for International Application No. PCT/EP2020/057373, dated May 25, 2020, 11 pages.

* cited by examiner

*Primary Examiner* — Brandi N Hopkins
*Assistant Examiner* — Nigel H Plumb
(74) *Attorney, Agent, or Firm* — Buchanan Ingersoll & Rooney, PC

(57) ABSTRACT

A method for detecting the occurrence of snoring during operation of a machine configured for transporting liquid. The machine includes an impeller and an electric motor, operatively connected to a control unit. The method includes operating the machine in order to transport liquid on the condition that the instantaneous power of the machine is directed towards a set power level. The instantaneous power of the machine is allowed to fluctuate within a set power level range defined upwards by a max-factor times the set power level and defined downwards by a min-factor times the set power level. The method further includes determining the machine is snoring by the control unit when the instantaneous power of the machine is below a snoring level equal to a snoring-factor times the set power level by monitoring at least one of the operational parameters of power, current, or power factor of the machine.

21 Claims, No Drawings

METHOD FOR DETECTING A PUMP OR MIXER OPERATING IN PART LIQUID AND PART GAS

CROSS-REFERENCE TO RELATED APPLICATIONS

This application is the National Stage filing of International Application No. PCT/EP2020/057373, filed 18 Mar. 2020, and claims priority to European Patent Application No. 19164028.3, filed 20 Mar. 2019, both of which are incorporated herein by reference for all purposes.

TECHNICAL FIELD OF THE INVENTION

The present invention relates generally to the field of methods for controlling the operation of a machine suitable for transporting liquid, such as a submersible sewage/wastewater pump, a submersible drainage pump or a submersible sewage/wastewater mixer. The present invention relates more specifically to the field of methods for detecting the occurrence of snoring, i.e. when the impeller/propeller of the machine operate partly in liquid and partly in gas/air. Thus, the present invention is directed towards a machine comprising an impeller and an electric motor and being operatively connected to a control unit.

BACKGROUND OF THE INVENTION

During operation of a submersible machine, such as a pump, there is no problem as long as the pump is able to pump/transport liquid, i.e. the inlet of the pump is located below the liquid surface and only liquid enters the pump volute. But when the liquid surface falls below the inlet of the pump, the pump will start to suck partly liquid and partly gas/air during operation, and the impeller will operate partly in liquid and partly in gas/air. This phenomenon is called snoring, due to the snoring sound generated by the pump during such conditions. The same snoring phenomena occurs for submersible mixers intended to transport/mix sewage/wastewater in a tank, there is no problem when the impeller/propeller of the mixer is fully submerged. But when the liquid surface falls and the blades of the impeller/propeller travels above the liquid surface part of the revolution, the impeller will operate partly in liquid and partly in gas/air.

During snoring the torque demand/requirement of the machine, more precisely the torque demand of the electric motor of the machine, will decrease at a stable operational speed. Thus, the current and the power of the machine/motor will decrease and the power factor [cos φ] of the machine/motor will change during snoring since the torque of the machine/motor decreases during snoring. The relation between operational speed, torque, power, current and power factor is dependent on the specific machine/motor. For a specific machine/motor these relationships are well-known and by monitoring one or more of these quantities the other quantities are considered equivalently known.

For some applications, such as a pump station comprising a submersible sewage/wastewater pump, the pump is usually stopped by the control unit based on a stop-signal from a level sensor before the liquid surface falls below the pump inlet. However, as a safety feature the pump may also be stopped when it is identified that the pump is snoring, which for instance can be the case if the level sensor malfunctions. When the pump is snoring the operation of the pump is no longer productive at the same time as the pump continues to use energy, i.e. consumes a lot of energy without generating any liquid output. Thereto, the electric motor and other components of the pump might become damaged due to overheating/wear if the pump is left to snore a long period of time. It is also a problem in some applications if air is pumped into the outlet conduit, leading to possible water hammer and pressure head losses. In some applications and situations the pump is intended to snore in order to remove the grease/waste floating on the liquid surface, or at least brake the cake of grease/waste accumulated/generated on the liquid surface.

When a mixer is operated in a snoring condition the load on the drive shaft and bearings of the mixer will be uneven leading to elevated wear.

For some applications, such as a submersible drainage/dewatering pump not having a pump stop level sensor, the pump will generally be active, also when the pump is snoring, until the pump is manually turned off. If the operator of the pump is not observant and the pump is driven too long in a snoring condition, it will cause wear as well as high mechanical stress of the components of the pump, such as impeller, suction cover, seals, electric motor, etc. The detection of snoring may in such circumstances be used to lower the operational speed of the pump a period of time until the liquid surface is above the pump inlet once more or at a pump start liquid level.

There are known methods to detect snoring but they are especially focusing on machines having a fast and sophisticated regulation of the operational speed of the machine in order to direct the instantaneous power of the machine towards a set power level. Such operation is also known as constant power regulation, i.e. during normal snoring-free operation the regulation of the operational speed is so fast that the instantaneous power of the machine is more or less constant. Known methods, such as EP3246572, detects a fluctuation/deviation of the average power from the set power level by 2% as snoring provided that the operational speed of the machine is increasing at the same time.

However, there is a need to be able to detect snoring also in situations where the operational speed of the machine is at max and/or cannot be regulated, where the nature of the transported sewage/wastewater is highly varying leading to a natural fluctuation/deviation from the set power level more than 2%, where the regulation loop of the operational speed of the machine is slow so that if an average power of the machine is determined it will not be a correct representation of the true operation.

OBJECT OF THE INVENTION

The present invention aims at providing an improved method for detecting the occurrence of snoring during operation of a machine intended for transporting liquid. A primary object of the present invention is to provide an improved method of the initially defined type that in a reliable way will detect whether the machine is snoring in an unknown or changing environment. It is another object of the present invention to provide a method, which makes use of the control unit that is configured to drive the machine in operation to likewise detect snoring. It is also an object of the present invention to provide a method, which does not need to monitor or know the operational speed of the machine. It is an object of the present invention to determine snoring based on the instantaneous power of the machine.

SUMMARY OF THE INVENTION

According to the invention at least the primary object is attained by means of the initially defined method having the features defined in the independent claim. Preferred embodiments of the present invention are further defined in the dependent claims.

According to the present invention, there is provided a method of the initially defined type, which is characterized by the steps of: operating the machine in order to transport liquid, the machine being operated on the condition that the instantaneous power of the machine is directed towards a set power level (Pset), wherein the instantaneous power of the machine is allowed to fluctuate within a set power level range (Prange) defined upwards by a max-factor [100+Xup] % times the set power level (Pset) and defined downwards by a min-factor [100−Xdown] % times the set power level (Pset), and by means of the control unit determining that the machine is snoring when the instantaneous power of the machine is below a snoring level (Psnor) equal to a snoring-factor [100−(Xdown+W)] % times the set power level (Pset), by monitoring at least one of the operational parameters: power [P], current [I] and power factor [cos φ] of the machine, wherein the W-element in the snoring-factor [100−(Xdown+W)] % is more than 0 and equal to or less than 25.

According to the present invention, there is also provided a computer program product comprising at least one non-transitory computer-readable storage medium having computer-readable program code portions embedded therein, wherein the computer-readable program code portions are configured to execute the steps of the method according claim 1 in order to detect the occurrence of snoring during operation of a machine intended for transporting liquid.

Thus, the present invention is based on the understanding that for a machine (pump or mixer) operated on the condition that the instantaneous power of the machine is directed towards a set power level, independently of the machine having a stable/constant or a greatly fluctuating instantaneous power, the snoring level is offset the power level range within which the instantaneous power of the machine is allowed to fluctuate during snoring-free operation. The bigger the offset, the more reliable detection of the occurrence of snoring is present. The present invention is applicable both to direct-online machines and to machines where the operational speed is regulated.

In a preferred embodiment of the present invention, in the first step: by means of the control unit operating the machine in order to transport liquid, the control unit controlling the operation of the machine on the condition that the instantaneous power of the machine is directed towards a set power level (Pset). Thereby the snoring can be detected in a reliable and effective way by means of the same control unit that monitors/controls the operation of the machine.

According to a preferred embodiment, the Xdown-element in the min-factor [100−Xdown] % is equal to or more than 3 and equal to or less than 25.

According to a preferred embodiment, the snoring-factor [100−(Xdown+W)] % is equal to or more than 70%.

According to a preferred embodiment, the set power level (Pset) is a measured target value determined during snoring-free operation of the machine. Thus, the set power level is based on the actual fluctuation of the instantaneous power of the machine during snoring-free operation.

Further advantages with and features of the invention will be apparent from the other dependent claims as well as from the following detailed description of preferred embodiments.

DETAILED DESCRIPTION OF PREFERRED EMBODIMENTS OF THE INVENTION

The present invention relates to a method for controlling the operation of a machine suitable for transporting liquid, such as sewage/wastewater, liquid comprising solid matter, slurry, clean water, etc. The machine is constituted by a submersible sewage/wastewater pump, a submersible drainage/dewatering pump, or a submersible sewage/wastewater mixer, i.e. a machine comprising an impeller/propeller configured to transport liquid. The present invention relates specifically to a method for detecting the occurrence of snoring during operation of such a machine, i.e. an operational condition wherein the impeller operates/rotates partly in air and partly in liquid. The machine is operatively connected to a control unit or controller, wherein the control unit is configured to at least monitor at least one of the operational parameters power [P], current [I] and power factor [cos φ] of the machine/motor, and to detect when the machine is snoring.

When snoring is detected, this information can be used to stop the machine, to notify an operator, be used as input in another control method associated with the machine, to calibrate different sensors used in connection with the machine, etc.

According to the invention, the method comprises the steps of:

operating the machine in order to transport liquid, the machine being operated on the condition that the instantaneous power of the machine is directed towards a set power level (Pset), wherein the instantaneous power of the machine is allowed to fluctuate within a set power level range (Prange) defined upwards by a max-factor [100+Xup] % times the set power level (Pset) and defined downwards by a min-factor [100−Xdown] % times the set power level (Pset), and by means of the control unit determining that the machine is snoring when the instantaneous power of the machine is below a snoring level (Psnor) equal to a snoring-factor [100−(Xdown+W)] % times the set power level (Pset).

It shall be pointed out that the term "set power level" is construed to mean a predetermined/preset value/threshold of the actual electric power consumed by the machine/pump, and the term "snoring level" is construed to mean a value/threshold of the actual electric power consumed by the machine/pump below which snoring is considered determined.

It shall be pointed out that the term "when", in connection with snoring detection, is construed to mean "as soon as". It shall also be pointed out that the present invention can be used in parallel to other snoring detection methods. The term "power of the machine" is construed to mean the power consumption of the machine/motor at the present operational condition. The term "current of the machine" is construed to mean the current consumption of the machine/motor at the present operational condition. Depending on which operational parameters/quantities that are monitored the occurrence of decreasing power consumption is determined directly or indirectly/correspondingly, which is considered equivalent for the skilled person. Thus, if current is the monitored quantity, the instantaneous current is compared with a current level that corresponds to the power level at snoring, i.e. when the instantaneous current passes said current level at snoring the instantaneous power consumed by the machine passes the snoring level.

The present invention is especially intended for applications wherein the instantaneous power of the machine will fluctuate greatly within the set power level range (Prange) in normal snoring-free operation and/or when the degree of normal fluctuation is unknown. For instance due to varying nature of the transported liquid, a slow control loop, etc.

The present invention is applicable to direct-online machines, i.e. a machine that is operated by a constant frequency, i.e. the frequency Hz of the power mains. Thereby the machine is operated such that the instantaneous power of the machine is directed towards the set power level (Pset) during snoring-free/normal operation of the machine. The control unit is configured to monitor at least one of the power and current drawn by the machine and to detect when the instantaneous power of the machine is below the snoring level (Psnor). The monitoring can be performed continuously or intermittently.

The present invention is also applicable to more sophisticated or intelligent machines. The machine is operatively connected to a control unit, and according to a preferred embodiment the control unit is built-in into the machine. In such applications, the machine is driven in operation by the control unit, i.e. the machine is operated by means of the control unit to transport liquid, wherein the control unit controls the operation of the machine on the condition that the instantaneous power of the machine is directed towards a set power level (Pset). Thus, the control unit strives to keep the instantaneous power of the machine at a constant level by adjusting the operational speed of the machine. In a preferred embodiment the control unit is constituted by a Variable Frequency Drive [VFD] which is configured to regulate the operational speed of the machine, for instance by regulating the frequency Hz of the alternating current supplied to the electrical motor of the machine. Thus, the control unit is configured to monitor/regulate/control the operational speed of the machine, and the control unit is also configured to monitor at least one of the operational parameters power and current drawn by the machine. The monitoring can be performed continuously or intermittently. The control unit is also configured to detect when the instantaneous power of the machine is below the snoring level (Psnor).

According to a one embodiment the machine is stopped directly after it is determined that the machine is snoring, and according to another embodiment the machine is stopped after a predetermined time period has elapsed after it is confirmed that the machine is snoring, depending on application of use. The stopping of the machine comprise ramping down the operational speed of the machine or a direct/abrupt stop of the operational speed of the machine, for instance by setting the operational speed equal to zero in the control unit or by operatively disengaging the machine from the power mains.

After the machine has been stopped due to snoring, the machine is kept inactive until a new start criterion/condition is present. According to one embodiment the machine is kept inactive a predetermined pause time, or according to another embodiment the machine is kept inactive until the control unit obtains a start-signal from a sensor or the operator. Thereafter the machine is once again active until it is stopped manually, due to snoring, by a stop-signal from a level sensor, etc.

According to a preferred embodiment the Xup-element in the max-factor [100+Xup] % is equal to or more than 3 and equal to or less than 25. Preferably the Xup-element is equal to or more than 5 and equal to or less than 20. Thereto, it is preferred that the Xdown-element in the min-factor [100−Xdown] % is equal to or more than 3 and equal to or less than 25. Preferably the Xdown-element is equal to or more than 5 and equal to or less than 20.

Thereto, according to the invention the W-element in the snoring-factor [100−(Xdown+W)] % is strictly more than 0 and equal to or less than 25. Preferably the W-element is equal to or more than 3 and equal to or less than 10. It is preferred that superior to the above limits, the snoring-factor [100−(Xdown+W)] % is equal to or more than 70%, preferably equal to or more than 80%.

Thus, fluctuations/deviations of the instantaneous power of the machine within the power level range (Prange) are normal and only when the instantaneous power of the machine is below the offset snoring level (Psnor) the machine is determined as snoring. According to a preferred embodiment, the instantaneous power of the machine is determined as being below the snoring level (Psnor) when the instantaneous power of the machine is below the snoring level (Psnor) a plurality of times/samples during a predetermined period of time [t], equal to or less than 3 seconds.

The Xup-element and Xdown-element may be predetermined values, or may be values determined/measured during snoring-free operation of the machine. Thereto, the set power level (Pset) may be a predetermined target value, or may be target values determined/measured during snoring-free operation of the machine.

In the embodiment where the set power level (Pset) is a measured target value, it is preferably determined as an average of the instantaneous power of the machine during a predetermined period of time [t]. The predetermined period of time [t] is equal to or more than 1 second and equal to or less than 30 seconds. Preferably the predetermined period of time is equal to or more than 3 seconds and equal to or less than 10 seconds. The average of the instantaneous power of the machine is preferably based on a plurality of samples [m] evenly distributed over the predetermined period of time [t]. The number of samples [m] is equal to or less than 50 and equal to or more than 10. Preferably the number of samples [m] is equal to or less than 20. It shall be pointed out that a target value of the set power level (Pset) measured/determined during snoring-free operation of the machine may be used as a predetermined target value during subsequent operation of the machine.

In another aspect of the invention it is provided a computer program product comprising at least one non-transitory computer-readable storage medium having computer-readable program code portions embedded therein, wherein the computer-readable program code portions are configured to execute the steps of the described method when run in a control unit detecting the occurrence of snoring during operation of a machine intended for transporting liquid.

FEASIBLE MODIFICATIONS OF THE INVENTION

The invention is not limited only to the embodiments described above, which primarily have an illustrative and exemplifying purpose. This patent application is intended to cover all adjustments and variants of the preferred embodiments described herein, thus the present invention is defined by the wording of the appended claims and the equipment may be modified in all kinds of ways within the scope of the appended claims.

It shall also be pointed out that even thus it is not explicitly stated that features from a specific embodiment may be combined with features from another embodiment, the combination shall be considered obvious, if the combination is possible.

The invention claimed is:

1. A method for detecting the occurrence of snoring during operation of a machine configured for transporting liquid, wherein the snoring detection is performed without monitoring an operational speed of the machine, the machine comprising an impeller and an electric motor, operatively connected to a control unit, the method comprising the steps of:
- defining a max-factor equal to [100+Xup]%;
- defining a min-factor equal to [100−Xdown]%;
- defining a snoring-factor equal to [100−(Xdown+W)]%, wherein W is more than 0 and equal to or less than 25;
- operating the machine to transport liquid such that an instantaneous power of the machine is directed towards a set power level (Pset) and allowed to fluctuate within a set power level range (Prange) defined upwards by the max-factor times the set power level (Pset) and defined downwards by the min-factor times the set power level (Pset); and
- with the control unit, determining the instantaneous power of the machine by monitoring at least one of operational parameters: power [P], current [I] or power factor [cos φ] of the machine, and determining that the machine is snoring when the instantaneous power of the machine is below a snoring level (Psnor) equal to the snoring-factor times the set power level (Pset).

2. The method of claim 1, wherein the step of operating the machine to transport liquid further includes: the control unit controlling the operation of the machine to direct the instantaneous power towards the set power level (Pset).

3. The method of claim 1, wherein Xup is in a range from greater than or equal to 3 to less than or equal to 25.

4. The method of claim 1, wherein Xdown is in a range from greater than or equal to 3 to less than or equal to 25.

5. The method of claim 1, wherein the defined snoring-factor is equal to or more than 70%.

6. The method of claim 1, wherein the instantaneous power of the machine is determined as being below the snoring level (Psnor) when the instantaneous power of the machine is below the snoring level (Psnor) a plurality of times during a predetermined period of time [t] equal to or less than 3 seconds.

7. The method of claim 1, wherein the set power level (Pset) is a predetermined target value.

8. The method of claim 1, wherein the set power level (Pset) is a measured target value determined during snoring-free operation of the machine.

9. The method of claim 8, wherein the measured target value is determined as an average of the instantaneous power of the machine during a predetermined period of time [t].

10. The method according to claim 9, wherein the predetermined period of time [t] is in a range from greater than or equal to 1 second to less than or equal to 30 seconds.

11. The method according to claim 10, wherein the predetermined period of time [t] range is equal to or more than 3 seconds, and equal to or less than 10 seconds.

12. The method according to claim 9, wherein the average of the instantaneous power of the machine is based on a plurality of samples [m] evenly distributed over the predetermined period of time [t].

13. The method according to claim 12, wherein the number of samples [m] is equal to or less than 50.

14. The method according to claim 13, wherein the number of samples [m] is in a range of from greater than or equal to 10 to less than or equal to 20.

15. The method of claim 1, wherein the method further comprises: stopping the machine due to snoring by means of the control unit, when the instantaneous power of the machine is determined as being below the snoring level (Psnor).

16. The method of claim 15, wherein the method further comprises: after stopping the machine due to snoring, keeping the machine inactive inactive a predetermined pause time.

17. The method of claim 15, wherein the method further comprises: after stopping the machine due to snoring, keeping the machine inactive until the control unit obtains a start-signal from a sensor.

18. The method of claim 1, wherein the control unit comprises a variable frequency drive.

19. The method of claim 1, wherein the machine comprises a submersible machine.

20. A computer program product comprising at least one non-transitory computer-readable storage medium having computer-readable program code portions embedded therein, the computer readable program code portions configured to cause a control unit for a machine configured for transporting liquid to execute the steps of the method according to claim 1 to detect snoring during operation of the machine.

21. The method of claim 19, wherein the submersible machine comprises a submersible pump or a submersible mixer.

* * * * *